(12) United States Patent
Yan et al.

(10) Patent No.: US 9,379,392 B2
(45) Date of Patent: Jun. 28, 2016

(54) TEMPERATURE CONTROL METHOD AND BATTERY SYSTEM

(75) Inventors: Xiaofeng Yan, Weinstadt (DE); Christian Pankiewitz, Stuttgart (DE); Sylvain Guenon, Ressons sur Matz (FR); Achim Schmidt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1025 days.

(21) Appl. No.: 13/508,660

(22) PCT Filed: Sep. 23, 2010

(86) PCT No.: PCT/EP2010/064022
§ 371 (c)(1),
(2), (4) Date: Aug. 1, 2012

(87) PCT Pub. No.: WO2011/057853
PCT Pub. Date: May 19, 2011

(65) Prior Publication Data
US 2012/0295142 A1 Nov. 22, 2012

(30) Foreign Application Priority Data
Nov. 10, 2009 (DE) .......................... 10 2009 046 567

(51) Int. Cl.
*H01M 10/50* (2006.01)
*H01M 6/50* (2006.01)
(Continued)

(52) U.S. Cl.
CPC .......... *H01M 6/5038* (2013.01); *H01M 10/482* (2013.01); *H01M 10/486* (2013.01);
(Continued)

(58) Field of Classification Search
CPC ............ H01M 10/50; H01M 10/5006; H01M 10/5022; H01M 6/5038; H01M 10/0525; H01M 10/482; H01M 10/486; H01M 10/625; H01M 10/63; H01M 10/615; H01M 10/633; H01M 10/656
USPC .......................................................... 429/62
See application file for complete search history.

(56) References Cited

U.S. PATENT DOCUMENTS 5,141,826 A      8/1992  Böhm et al.
2003/0184256 A1* 10/2003  Kopf et al. ................... 320/101

FOREIGN PATENT DOCUMENTS

CN    101053110 A    10/2007
CN    101401252 A    4/2009
(Continued)

OTHER PUBLICATIONS

International Search Report corresponding to PCT Application No. PCT/EP2010/064022, mailed Jan. 12, 2011 (German and English language document) (6 pages).

*Primary Examiner* — Sarah A Slifka
*Assistant Examiner* — Brent Thomas
(74) *Attorney, Agent, or Firm* — Maginot, Moore & Beck LLP

(57) ABSTRACT

A temperature control method and a battery system create an optimal temperature range for operating a battery. The battery cells of the battery lie in several separate modules that are integrated in a temperature control circuit. Heat is increased stepwise in a heating phase in which only one first module is heated by means of a temperature control medium, the medium being active in the temperature control circuit and being heated by means of a heating element. The heat that is generated during the operation of at least the first module is used to heat at least one further module.

4 Claims, 2 Drawing Sheets

(51) Int. Cl.
*H01M 10/48* (2006.01)
*H01M 10/625* (2014.01)
*H01M 10/63* (2014.01)
*H01M 10/615* (2014.01)
*H01M 10/633* (2014.01)
*H01M 10/656* (2014.01)
*H01M 10/0525* (2010.01)

(52) U.S. Cl.
CPC .......... *H01M10/615* (2015.04); *H01M 10/625* (2015.04); *H01M 10/63* (2015.04); *H01M 10/633* (2015.04); *H01M 10/656* (2015.04); *H01M 10/0525* (2013.01)

(56) References Cited

FOREIGN PATENT DOCUMENTS

| | | |
|---|---|---|
| CN | 201311957 Y | 9/2009 |
| DE | 195 34 427 A1 | 3/1996 |
| DE | 10 2005 025 142 A1 | 1/2006 |
| DE | 10 2009 000 952 A1 | 8/2010 |
| EP | 1 302 998 A1 | 4/2003 |
| WO | 2007/102756 A1 | 9/2007 |
| WO | WO 2007102756 A1 * | 9/2007 ............ H01M 10/39 |

* cited by examiner

TEMPERATURE CONTROL METHOD AND BATTERY SYSTEM

This application is a 35 U.S.C. §371 National Stage Application PCT/EP2010/064022, filed on Sep. 23, 2010, which claims the benefit of priority to Serial No. DE 10 2009 046 567 .7, filed on Nov. 10, 2009 in Germany, the disclosures of which are incorporated herein by reference in their entirety.

The disclosure relates to a temperature-control method and a battery system, by way of which an optimum temperature range for operating a battery can be created.

BACKGROUND

It is known to use a battery management system to regulate the power output and power consumption such that the battery works in a particular temperature range. However, it is not possible for the entire power potential of the battery to be exhausted thereby.

It is also known to use cooling media, such as air, cooling water or coolant, which draw heat from the battery and emit it to the outside. Although a higher power output is possible therewith, it is only possible for temperatures to be limited upwardly by way of cooling. Precisely for automotive applications, it is important to protect batteries, such as lithium-ion batteries, not only from overheating but also from overcooling. Overcooling considerably reduces the power output of a lithium-ion battery. If a vehicle having this battery is parked at cold temperatures, the battery can cool down so far that the greatest possible power output of the battery is too low for use.

Means for heating a battery are also known. Thus, latent heat stores integrated into battery systems can store thermal energy during a phase transition of a storage medium and release it again during a return transition. However, this method can only be used in a limited temperature range, and also the return transition cannot be temporally controlled. It takes place automatically in a manner dependent on the ambient temperature.

SUMMARY

Therefore, the disclosure is based on the object of providing a method and an apparatus by way of which a battery can be heated in an energy-saving manner prior to a cold start.

This object is achieved by a temperature-control method described herein, by a battery system described herein and by a vehicle described herein.

In the temperature-control method for temperature-controlling a battery, battery cells of the battery are arranged in a plurality of separate modules integrated in a temperature-control circuit, wherein heating takes place in a stepwise manner in a heating phase, in that in a first step only a first module is heated by means of a temperature-control medium that acts in the temperature-control circuit and is heated by means of a heating element, and in at least one further step heat produced during operation at least of the first module is used for heating at least one further module.

In this way, the heat produced by the operation of the modules is advantageously used concomitantly to heat further modules. As a result, the heating as a whole is carried out in a very energy-saving manner. By way of the method according to the disclosure, a cold start of the battery in a more gentle manner which is advantageous for the battery is also carried out, since initially only the modules already heated to a particular temperature are put into operation.

In a preferred configuration of the disclosure, it is provided that the temperature-control medium is transported by a pump. In this way, the volumetric flow of the temperature-control medium is advantageously adapted to the requirements.

In a further preferred configuration of the disclosure, it is provided that the modules of the battery are integrated separately into the temperature-control circuit by means of the setting of control valves. In this way, the modules are advantageously supplied separately with the temperature-control medium. Depending on the requirement of the individual module, the latter is assigned a corresponding proportion of the volumetric flow of the temperature-control medium.

In a further preferred configuration of the disclosure, it is provided that the heating method is regulated by a battery management system, wherein the battery management system determines at least one temperature at the battery, power consumption and power output at the battery, a temperature of the temperature-control medium and a volumetric flow of the temperature-control medium as parameters and the battery management system adjusts the pump, the heating element and the control valves taking the parameters determined into consideration. In this way, the optimum temperature range of the battery is advantageously created automatically. By way of the regulation of the battery management system, the heating can take place in a very energy-saving manner.

Furthermore, the object is achieved by a battery system described herein.

The battery system according to the disclosure comprises a battery management system, a battery having battery cells arranged in at least two modules, a temperature-control circuit having a temperature-control medium, a heating element, a pump and control valves, wherein the battery management system comprises detection of the temperature of the modules, detection of the temperature of the temperature-control medium and detection of the volumetric flow of the temperature-control medium, and the heating element, the pump and the control valves are adjustable by the battery management system such that the modules are heatable separately by the temperature-control medium.

This makes it advantageously possible for the individual modules to be able to be heated in a stepwise manner and for the heat produced during operation of the modules to be able to be used for heating the other modules. Heating of the entire battery is thus possible in a much more favorable manner in terms of energy. The battery can thus always be operated in an optimum temperature range. This advantageously leads to a longer service life and greater operational reliability of the battery.

In a preferred configuration of the disclosure, it is provided that one module is a starting unit having smaller dimensions than the other modules. This makes it advantageously possible for less energy to be required for heating in the event of a cold start, since it takes less energy to heat a smaller module than a large one.

In a further preferred configuration, the starting unit comprises less than 80%, in particular less than 50% of the mass and/or the volume and/or the number of the battery cells, compared with the module of the next size up.

In a further preferred configuration of the disclosure, it is provided that the temperature-control circuit has a heat exchanger. This makes it advantageously possible for the temperature-control medium to be able to emit thermal energy to the environment and thus to be additionally usable for cooling the battery.

In a further preferred configuration of the disclosure, it is provided that the battery system has a bypass around the heat exchanger and a mixing valve. This makes it advantageously possible for the temperature-control medium to be passed directly to the compensating vessel having the heating element in the heating phase. The temperature-control medium thus does not unnecessarily emit heat to the heat exchanger and the feed line to the heat exchanger. The heating phase can thus be run through in a more advantageous manner in energy terms.

In a further preferred configuration of the disclosure, it is provided that the battery is a lithium-ion battery. Lithium-ion cells advantageously offer better performance than other cell types. They have a better weight-specific and mass-specific capacity and a longer service life.

The battery system according to the disclosure is advantageously implemented in all the abovementioned configurations in a vehicle.

Furthermore, the object is achieved by a vehicle described herein.

The vehicle according to the disclosure comprises a battery system having a battery management system, a battery having battery cells arranged in at least two modules, a temperature-control circuit having a temperature-control medium, a heating element, a pump and control valves, wherein the battery management system comprises detection of the temperature of the modules, detection of the temperature of the temperature-control medium and detection of the volumetric flow of the temperature-control medium, and the heating element, the pump and the control valves are adjustable by the battery management system such that the modules are heatable separately by the temperature-control medium.

This makes it advantageously possible for the vehicle to be put into operation even at low external temperatures, and also without disadvantageously loading the battery as a result. Power can thus be drawn from or supplied to the battery even at winter temperatures. By way of the battery system, greater operational reliability is ensured in the vehicle battery.

Further preferred configurations of the disclosure are also described herein.

BRIEF DESCRIPTION OF THE DRAWINGS

The disclosure is explained in the following text using exemplary embodiments and with reference to the associated drawings, in which.

DETAILED DESCRIPTION

Figure 1:
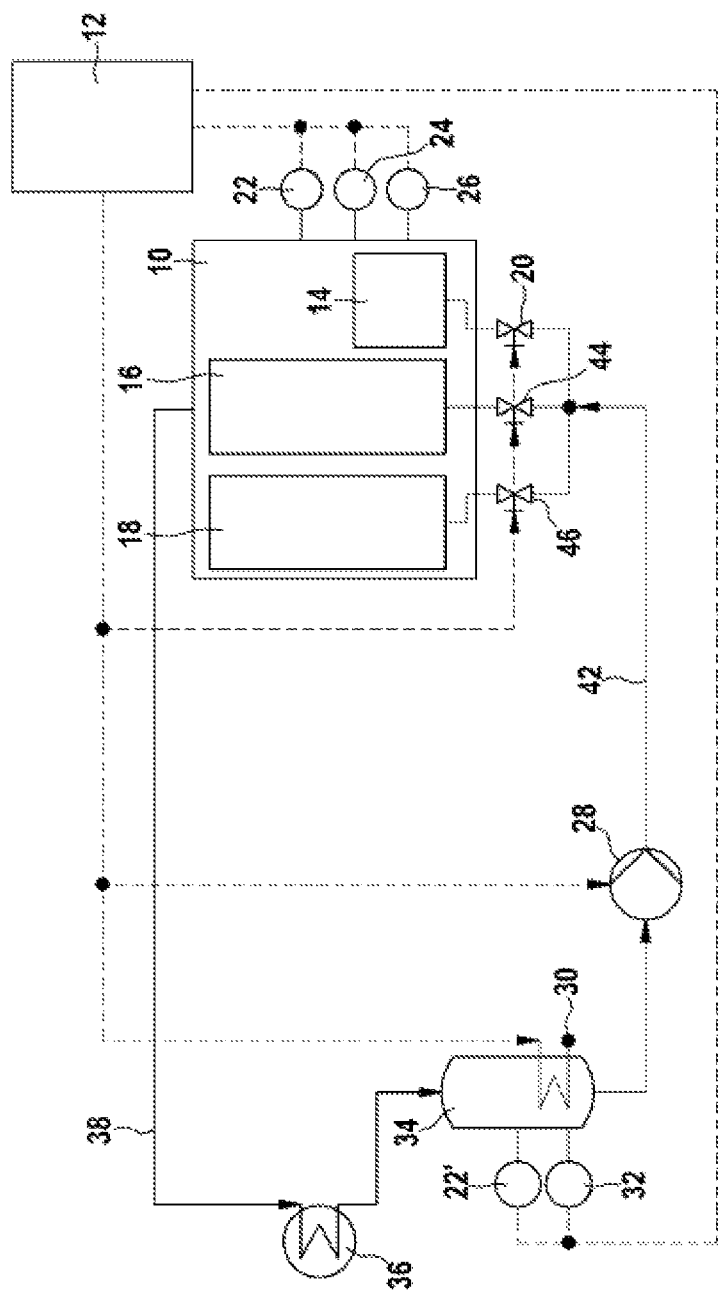
FIG. 1 shows an arrangement of a battery system according to the disclosure.

The temperature has a great influence on the power provision, aging and operational reliability of the battery. FIG. 1 illustrates a battery system according to the disclosure having an arrangement for temperature-controlling a battery 10. Thus, the battery 10 is protected both from overheating and from overcooling. The battery system according to the disclosure creates an optimum temperature range for operating the battery 10. Thus, the battery 10 heated by operation is cooled and a battery 10 cooled by the environment is heated when the temperatures threaten to depart from the optimum range.

The battery system according to the disclosure has optimum cold start properties, a cold start representing a start of operation at an ambient temperature below the optimum temperature range.

Battery cells of the battery 10 are in this case arranged in a plurality of modules 14, 16 and 18, of which the first module 14 forms a starting unit. In contrast to the remaining modules 16, 18, the starting unit is adapted to specific requirements of a cold start. The starting unit can therefore differ in terms of size, weight and/or the number of battery cells from the other modules. In FIG. 1, the starting unit is configured in a smaller manner. As a result, it can heat more quickly than the other modules 16, 18 at the same heat output or can heat at the same rate as the other modules 16, 18 with less heat output.

For temperature-control, the modules 14, 16, 18 are integrated into a temperature-control circuit. A temperature-control medium contained in the temperature-control circuit cools or heats the modules 14, 16, 18 depending on the current state of the modules. The temperature-control circuit comprises an inlet pipeline 42, an outlet pipeline 38, a heat exchanger 36, a compensating vessel 34 having a preferably integrated heating element 30, a pump 28 and control valves 20, 44, 46. The heating element can also be positioned outside the temperature-control circuit. The temperature-control is regulated by means of a battery management system 12. The latter detects at least a temperature 22 of the battery 10, a voltage 24 and current strength 26 and thus a power consumption and power output of the battery 10, a temperature 22' of the temperature-control medium in the compensating vessel 34 and a volumetric flow 32 of the temperature-control medium, and compares these with predefined setpoint values. For regulation, the battery management system regulates the pump 28, the heating element 30 and the control valves 20, 44, 46 in an appropriate manner.

In the event of a cold start, the battery system enters a heating phase. In the process, the temperature-control medium is heated by means of the heating element 30 in the compensating vessel 34. The pump 28 transports the heated temperature-control medium through the inlet pipeline 42 to the control valves 20, 44, 46. At first, only the control valve 20 for the first module 14, that is to say for the starting unit, is open and the other valves 44, 46 are closed. The heated temperature-control medium emits its heat to the starting unit 14 and is passed back into the compensating vessel again via the outlet pipeline 38. This process is continued until the starting unit 14 has reached an optimum temperature. From a certain operationally ready temperature, the starting unit 14 can start operation. The operationally ready temperature can be below the optimum temperature.

In operation, that is to say during charging or discharging, the starting unit 14 produces heat by ohmic heat losses on account of the internal resistance of the battery. This heat is additionally or exclusively used to reach the optimum temperature of the starting unit 14. If the starting unit 14 is at the optimum temperature, the starting unit 14 is no longer heated by the temperature-control medium. If the starting unit 14 is at a temperature above the optimum temperature, the starting unit 14 emits heat to the temperature-control medium.

From a particular temperature of the starting unit 14, in the range above the operationally ready temperature, including the operationally ready temperature, at least one further module 16, 18 is integrated into the temperature-control circuit. To this end, the corresponding control valve 44, 46 is opened. The temperature-control medium then absorbs heat from the heating element and/or from the heat produced by the starting unit 14 in operation, and emits this heat to the module connected in. In this case, the heating element 30 is only operated if necessary. Once the module 16, 18 connected in has also reached a particular temperature, the next module or modules is or are connected in. It is the most energy-saving when the module or modules connected in is or are heated exclusively by the heat produced by other modules in operation.

All of the modules 14, 16, 18 of the battery 10 can be heated individually by adjusting the control valves 20, 44, 46 by means of the temperature-control medium. The temperature-control medium obtains its thermal energy in this case by being heated by the heating element 30 and/or by absorbing heat from other modules 14, 16, 18 heated by operation.

If the modules 14, 16, 18 of the battery 10 reach a particular temperature above the optimum temperature, the battery system switches into a cooling phase. The modules 14, 16, 18 emit their now superfluous heat produced in operation to the temperature-control medium. The temperature-control medium, transported further to the heat exchanger by the pump 28, emits the heat in the heat exchanger 36 to the environment. The heating element 30 is not in operation during the cooling phase.

All of the modules 14, 16, 18 of the battery 10 can be cooled individually by adjusting the control valves 20, 44, 46 by means of the temperature-control medium. The temperature-control medium obtains its coldness by being cooled by the heat exchanger 36 and/or cold modules 14, 16, 18.

Figure 2:
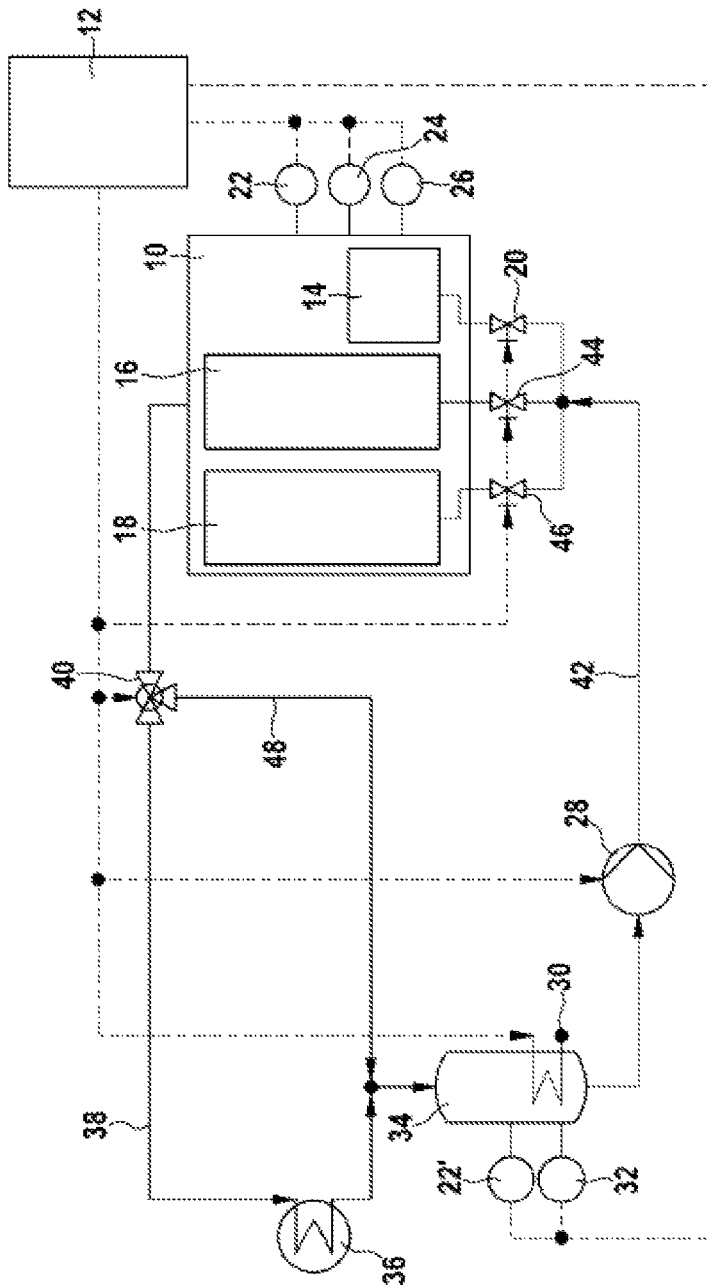
FIG. 2 shows a further arrangement of a battery system according to the disclosure.

FIG. 2 illustrates a further embodiment of the battery system according to the disclosure. In addition to the variant shown in FIG. 1, this battery system has a bypass 48 in the temperature-control circuit. The bypass 48 bypasses the heat exchanger 36. Thus, the temperature-control medium can be passed directly to the compensating vessel 34 having the heating element 30 in the heating phase. In this way, the temperature-control medium does not unnecessarily emit heat to the heat exchanger 36 and the feed line to the heat exchanger. The heating phase can thus be run through in a more advantageous manner in terms of energy. The flow of temperature-control medium is deflected by a mixing valve 40. This may be for example a thermostat having a preset temperature, above which the temperature-control medium is intended to be passed via the heat exchanger 36, or the mixing valve 40 is adjusted via the battery management system 12.

The invention claimed is:

1. A temperature-control method for temperature-controlling a battery, comprising:
    arranging battery cells of the battery in a plurality of separate modules integrated in a temperature-control circuit, wherein heating takes place in a stepwise manner in a heating phase;
    heating only a first module by means of a temperature-control medium that acts in the temperature-control circuit and is heated by means of a heating element; and
    heating at least one further module using heat produced during operation at least of the first module.

2. The temperature-control method as claimed in claim 1, further comprising:
    transporting the temperature-control medium by a pump.

3. The temperature-control method as claimed in claim 1, wherein the modules of the battery are integrated separately into the temperature-control circuit by means of the setting of control valves.

4. The temperature-control method as claimed in claim 3, wherein:
    the heating method is regulated by a battery management system,
    the battery management system determines at least one temperature at the battery, power consumption and power output at the battery, a temperature of the temperature-control medium and a volumetric flow of the temperature-control medium as parameters and the battery management system adjusts the pump, and
    the heating element and the control valves take the parameters determined into consideration.

* * * * *